C. F. JACOBS.
PROCESS OF WELDING RAILWAY RAILS.
APPLICATION FILED AUG. 5, 1915.
1,330,761.
Patented Feb. 10, 1920.
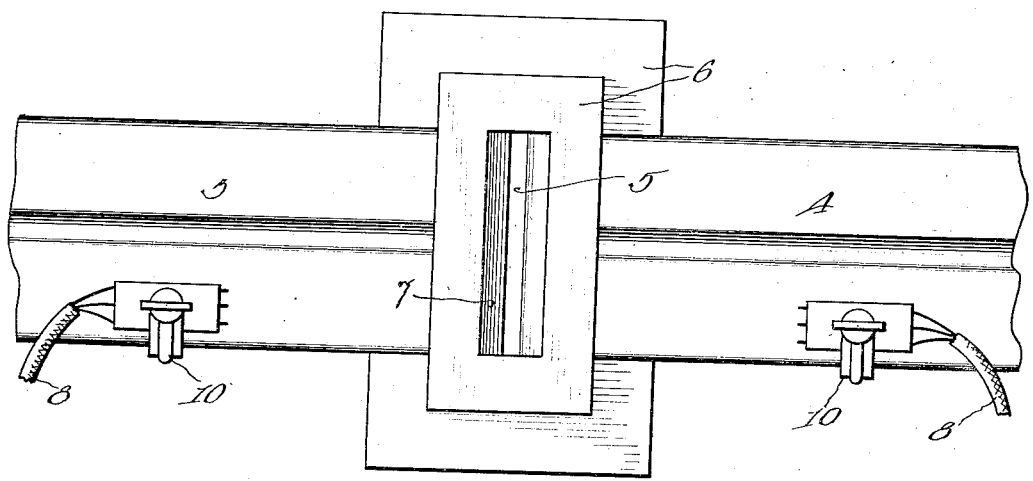
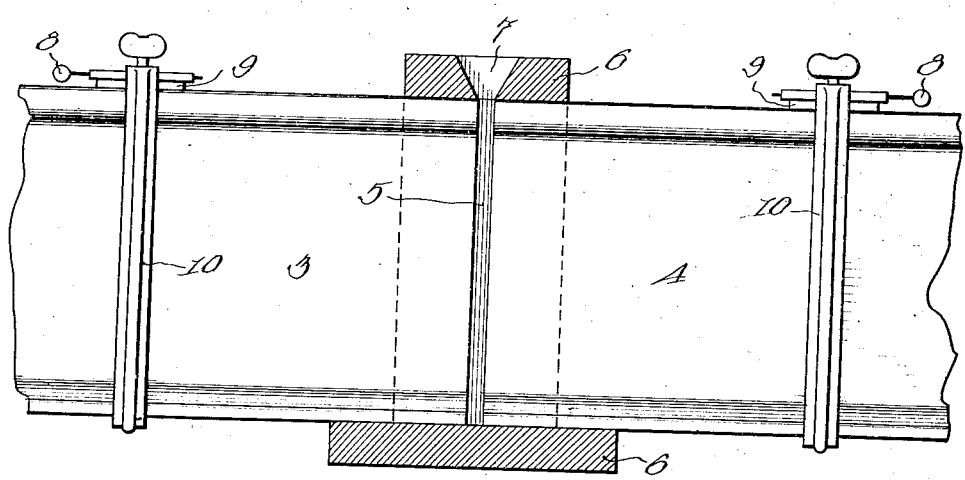

UNITED STATES PATENT OFFICE.

CHARLES F. JACOBS, OF CHICAGO, ILLINOIS.

PROCESS OF WELDING RAILWAY-RAILS.

1,330,761.         Specification of Letters Patent.    Patented Feb. 10, 1920.

Application filed August 5, 1915. Serial No. 43,742.

*To all whom it may concern:*

Be it known that I, CHARLES F. JACOBS, a citizen of the United States, residing at Chicago, in the county of Cook and State of Illinois, have invented certain new and useful Improvements in Processes of Welding Railway-Rails, of which the following is a specification.

This invention relates to certain new and useful improvements in the welding of railway rails in which an electric current is employed to heat the adjacent ends of adjacent rails to welding temperature to effect their union in a continuous rail.

The invention has for its object the elimination of extraneous metal which was hitherto inserted between the adjacent end faces of adjacent rails, and the direct welding of the metal of the rail ends, thus eliminating both the expense and inconvenience involved in the employment of other weldable material and practically retaining the homogeneity of the rail at the welded joints therein.

The invention may be practised with the apparatus that is illustrated by the accompanying drawing in which Figure 1 is a plan view of the adjacent ends of two rails slightly spaced apart showing them provided at their adjacent ends with a form of mold for retaining between them a quantity of flux and each equipped with a clamp holding an electric conductor, and Fig. 2 is a side view thereof with the mold shown in section.

Two rails 3, 4 are placed in alinement, with their adjacent ends slightly separated to form a space 5 surrounded by a mold 6 made of any suitable refractory material, and having an opening 7 which communicates with the space 5. The adjacent ends of the adjacent rails 3, 4 project into the mold which is thus effectively open only upon its top side whereby flux introduced into the space 5 through the opening 7 may be confined in the space between the rail ends. Electric conductors 8 lead from any suitable source of electric current supply to terminals 9, one terminal being carried by each of the clamps 10 fastened to the rails 3 and 4 near the ends of such rails, whereby the adjacent end portions of the rails and the flux in the space therebetween are included in series in the heating electric circuit.

When the rails and mold are adjusted preparatory to the welding operation, a quantity of flux is introduced in the space 5 through the mold opening 7.

Flux in solid condition is a poor or non-conductor of electricity but in molten condition it is a conductor but nevertheless of high resistance. When a current of electricity is passed through molten flux the temperature of the flux may be readily raised and the flux may thus be used to heat objects that it touches. If the flux is solid it is melted by an electric arc or otherwise made liquid to enable the electric current to pass through it. I prefer to pour the flux into the space 5 in a molten condition. The current passing through the flux maintains it molten and brings it to such a heat that enables it to bring the adjacent rail ends to welding heat. This flux also serves to dissolve and remove any oxid which might have been present upon the ends of the rails, thus leaving perfectly clean metal covered by molten flux and in a highly heated condition. When the adjacent end rails have been heated to welding temperature the rails are forced lengthwise together by any suitable mechanism, as a hydraulic clamp, whereby the molten flux is ejected from between the ends of the rails and the two rails without any oxid thereon and in a weldable condition are brought intimately together and become perfectly united by the welding together thereof that follows.

It is found in practice that as a result of the abutting of the rails and their consequent welding a fillet is formed all around the joint but this fillet is so small as not to interfere in any manner with the proper function of the rails, except on the top surface of the rail, where said fillet is ground off and the surface made smooth.

The product of the process of my invention is a very novel and much improved continuous rail system in which the joints uniting the adjacent ends of adjacent rails are formed in the original metal of the rails themselves rather than in part by metal inserted between the rail ends.

I claim:

The method of uniting adjacent rails of a railroad track which consists in spacing apart the adjacent end faces of the adjacent rails; confining molten flux in the space between said adjacent rail end faces; including the adjacent end portions of the rails having such end faces and the flux in the space therebetween in series in an electric circuit; passing electric current through said circuit to bring the flux to a high heat to maintain it molten and bring the portions of the rails at said end faces to welding temperature; and forcing relative movement of the rails toward each other to bring said end faces into welding engagement.

CHARLES F. JACOBS.

Witnesses:
 CHAS. C. TILLMAN,
 A. E. OLSON.